United States Patent
Lines et al.

(10) Patent No.: US 6,785,050 B2
(45) Date of Patent: Aug. 31, 2004

(54) CORROSION RESISTANT WIRE-GRID POLARIZER AND METHOD OF FABRICATION

(75) Inventors: Michael Lines, Provo, UT (US); Raymond T. Perkins, Orem, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 10/143,501

(22) Filed: May 9, 2002

(65) Prior Publication Data

US 2003/0227678 A1 Dec. 11, 2003

(51) Int. Cl.[7] .................................................. G02B 5/30
(52) U.S. Cl. ...................... 359/486; 359/489; 359/352
(58) Field of Search ................................. 359/486, 485, 359/489, 352

(56) References Cited

U.S. PATENT DOCUMENTS

| | | |
|---|---|---|
| 2,224,214 A | 12/1940 | Brown |
| 2,287,598 A | 6/1942 | Brown |
| 2,403,731 A | 7/1946 | MacNeille |
| 2,748,659 A | 6/1956 | Geffcken et al. |
| 2,887,566 A | 5/1959 | Marks |
| 3,046,839 A | 6/1962 | Bird et al. |
| 3,436,143 A | 4/1969 | Garren |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komamiski |
| 3,631,288 A | 12/1971 | Rogers |
| 3,731,986 A | 5/1973 | Fergason |
| 3,857,627 A | 12/1974 | Harsch |
| 3,857,628 A | 12/1974 | Strong |

(List continued on next page.)

FOREIGN PATENT DOCUMENTS

| | | |
|---|---|---|
| DE | 416157 | 7/1925 |
| DE | 296391 | 2/1950 |
| DE | 3707984 A1 | 3/1987 |
| EP | 0317910 A1 | 11/1987 |
| EP | 0336334 B1 | 4/1988 |
| EP | 0349144 B1 | 6/1988 |
| EP | 0349309 B1 | 6/1988 |
| EP | 0357946 B1 | 8/1988 |
| EP | 407830 B1 | 7/1989 |
| EP | 0407830 A2 | 7/1989 |

(List continued on next page.)

OTHER PUBLICATIONS

U.S. patent application Ser. No. 60/356,284.*
Lloyd Wiliiam Taylor Manual of Advanced Undergraduate Experiments in Physics, p. 302 (1959).
Flanders, "Application of ≈100 Å linewidth structures fabricated by shadowing techniques", J. Vac. Sci. Technol., 19(4), Nov./Dec. 1981.

(List continued on next page.)

*Primary Examiner*—Mark A. Robinson
*Assistant Examiner*—Lee Fineman
(74) *Attorney, Agent, or Firm*—Thorpe North & Western

(57) ABSTRACT

A polarizing device, such as a wire-grid polarizer, includes a substantial mono-layer of a corrosion inhibitor without adversely affecting the optical properties of the polarizing device. The polarizing device can include an optical element and a nano-structure, such as an array of a plurality of spaced-apart, elongated elements disposed on a substrate. The corrosion inhibitor is chemically bonded to surfaces of the elements to form the mono-layer. The mono-layer can have a thickness less than 100 Angstroms. A method of forming the substantial mono-layer can include treating the polarizing device with an amino phosphonate, such as a nitrilotris (methylene) triphosphonic acid.

24 Claims, 1 Drawing Sheet

U.S. PATENT DOCUMENTS

| | | | |
|---|---|---|---|
| 3,876,285 A | 4/1975 | Schwarzmüller | |
| 3,912,369 A | 10/1975 | Kashnow | |
| 3,969,545 A | 7/1976 | Slocum | |
| 4,009,933 A | 3/1977 | Firester | |
| 4,025,164 A | 5/1977 | Doriguzzi et al. | |
| 4,025,688 A | 5/1977 | Nagy et al. | |
| 4,049,944 A | 9/1977 | Garvin et al. | |
| 4,073,571 A | 2/1978 | Grinberg et al. | |
| 4,104,598 A | 8/1978 | Abrams | |
| 4,181,756 A | 1/1980 | Fergason | |
| 4,220,705 A | 9/1980 | Sugibuchi et al. | |
| 4,221,464 A | 9/1980 | Pedinoff et al. | |
| 4,268,127 A | 5/1981 | Oshima et al. | |
| 4,289,381 A | 9/1981 | Garvin et al. | |
| 4,294,119 A | 10/1981 | Soldner | |
| 4,308,079 A | 12/1981 | Venables et al. | |
| 4,456,515 A | 6/1984 | Krueger et al. | |
| 4,466,704 A | 8/1984 | Schuler et al. | |
| 4,492,432 A | 1/1985 | Kaufmann et al. | |
| 4,512,638 A | 4/1985 | Sriram et al. | |
| 4,514,479 A | 4/1985 | Ferrante | |
| 4,515,441 A | 5/1985 | Wentz | |
| 4,560,599 A | 12/1985 | Regen | |
| 4,679,910 A | 7/1987 | Efron et al. | |
| 4,688,897 A | 8/1987 | Grinberg et al. | |
| 4,711,530 A | 12/1987 | Nakanowatari et al. | |
| 4,743,092 A | 5/1988 | Pistor | |
| 4,743,093 A | 5/1988 | Oinen | |
| 4,759,611 A | 7/1988 | Downey, Jr. | |
| 4,759,612 A | 7/1988 | Nakatsuka et al. | |
| 4,799,776 A | 1/1989 | Yamazaki et al. | |
| 4,818,076 A | 4/1989 | Heppke et al. | |
| 4,840,757 A | 6/1989 | Blenkhorn | |
| 4,865,670 A | 9/1989 | Marks | |
| 4,895,769 A | 1/1990 | Land et al. | |
| 4,913,529 A | 4/1990 | Goldenberg et al. | |
| 4,946,231 A | 8/1990 | Pistor | |
| 4,966,438 A | 10/1990 | Mouchart et al. | |
| 4,991,937 A | 2/1991 | Urino | |
| 5,029,988 A | 7/1991 | Urino | |
| 5,061,050 A | 10/1991 | Ogura | |
| 5,087,985 A | 2/1992 | Kitaura et al. | |
| 5,113,285 A | 5/1992 | Franklin et al. | |
| 5,122,887 A | 6/1992 | Mathewson | |
| 5,122,907 A | 6/1992 | Slocum | |
| 5,139,340 A | 8/1992 | Okumura | |
| 5,157,526 A | 10/1992 | Kondo et al. | |
| 5,177,635 A | 1/1993 | Keilmann | |
| 5,204,765 A | 4/1993 | Mitsui et al. | |
| 5,216,539 A | 6/1993 | Boher et al. | |
| 5,225,920 A | 7/1993 | Kasazumi et al. | |
| 5,235,443 A | 8/1993 | Barnik et al. | |
| 5,235,449 A | 8/1993 | Imazeki et al. | |
| 5,239,322 A | 8/1993 | Takanashi et al. | |
| 5,245,471 A | 9/1993 | Iwatsuka et al. | |
| 5,279,689 A | 1/1994 | Shvartsman | |
| 5,295,009 A | 3/1994 | Barnik et al. | |
| 5,305,143 A | 4/1994 | Taga et al. | |
| 5,325,218 A | 6/1994 | Willett et al. | |
| 5,333,072 A | 7/1994 | Willett | |
| 5,349,192 A | 9/1994 | Mackay | |
| 5,357,370 A | 10/1994 | Miyatake et al. | |
| 5,383,053 A | 1/1995 | Hegg et al. | |
| 5,422,756 A | 6/1995 | Weber | |
| 5,436,761 A | 7/1995 | Kamon | |
| 5,466,319 A | 11/1995 | Zager et al. | |
| 5,485,499 A | 1/1996 | Pew et al. | |
| 5,486,935 A | 1/1996 | Kalmanash | |
| 5,486,949 A | 1/1996 | Schrenk et al. | |
| 5,490,003 A | 2/1996 | Van Sprang | |
| 5,506,704 A | 4/1996 | Broer et al. | |
| 5,508,830 A | 4/1996 | Imoto et al. | |
| 5,513,023 A | 4/1996 | Fritz et al. | |
| 5,513,035 A | 4/1996 | Miyatake et al. | |
| 5,517,356 A | 5/1996 | Araujo et al. | |
| 5,557,343 A | 9/1996 | Yamagishi | |
| 5,559,634 A | 9/1996 | Weber | |
| 5,570,215 A | 10/1996 | Omae et al. | |
| 5,574,580 A | 11/1996 | Ansley | |
| 5,579,138 A | 11/1996 | Sannohe et al. | |
| 5,594,561 A | 1/1997 | Blanchard | |
| 5,609,939 A | 3/1997 | Petersen et al. | |
| 5,612,820 A | 3/1997 | Schrenk et al. | |
| 5,619,356 A | 4/1997 | Kozo et al. | |
| 5,626,408 A | 5/1997 | Heynderickx et al. | |
| 5,658,060 A | 8/1997 | Dove | |
| 5,686,979 A | 11/1997 | Weber et al. | |
| 5,731,246 A * | 3/1998 | Bakeman et al. | 438/770 |
| 5,748,368 A | 5/1998 | Tamada et al. | |
| 5,748,369 A | 5/1998 | Yokota | |
| 5,798,819 A | 8/1998 | Hattori et al. | |
| 5,826,960 A | 10/1998 | Gotoh et al. | |
| 5,833,360 A | 11/1998 | Knox et al. | |
| 5,838,403 A | 11/1998 | Jannson et al. | |
| 5,841,494 A | 11/1998 | Hall | |
| 5,986,730 A | 11/1999 | Hansen et al. | |
| 5,991,075 A | 11/1999 | Katsuragawa et al. | 359/486 |
| 6,081,376 A | 6/2000 | Hansen et al. | |
| 6,082,861 A | 7/2000 | Dove et al. | |
| 6,108,131 A | 8/2000 | Hansen et al. | |
| 6,122,103 A | 9/2000 | Perkins et al. | |
| 6,234,634 B1 | 5/2001 | Hansen et al. | |
| 2002/0191286 A1 * | 12/2002 | Gale et al. | 359/486 |
| 2003/0117708 A1 * | 6/2003 | Kane | 359/513 |
| 2003/0180024 A1 * | 9/2003 | Edlinger et al. | 385/132 |

FOREIGN PATENT DOCUMENTS

| | | | |
|---|---|---|---|
| EP | 416157 A1 | 9/1989 | |
| EP | 0488544 A1 | 11/1990 | |
| EP | 0507445 A2 | 3/1991 | |
| EP | 0518111 A1 | 5/1991 | |
| EP | 0588937 B1 | 6/1991 | |
| EP | 0521591 B1 | 7/1991 | |
| EP | 0543061 A1 | 11/1991 | |
| EP | 0606940 A2 | 1/1993 | |
| EP | 0634674 A2 | 6/1993 | |
| EP | 0670506 A1 | 9/1993 | |
| EP | 0744634 A2 | 5/1995 | |
| JP | 0084502 | 8/1989 | |
| JP | 10073722 A * | 3/1998 | G02B/5/30 |
| SU | 1781659 A1 | 10/1990 | |

OTHER PUBLICATIONS

Kuta and van Driel, "Coupled–wave analysis of lamcllar metal transmission gratings for the visible and the infrared," J. Opt. Soc. Am. A/vol. 12, No. 5/May 1995.

Lockbihler and Depine, "Diffraction from highly conducting wire gratings of arbitrary cross–section," Jornal of Modern Optics, 1993, vol. 40, No. 7, pp. 1273–1298.

Novak et al., "Far infrared polarizing grids for use at cryogenic temperatures," Applied Optics, Aug. 15, 1989/ vol. 28, No. 15, pp. 3425–3427.

Auton and Hutley, "Grid Polarizers for Use in the Near Infrared," Infrared Physics, 1972, vol. 12, pp. 95–100.

Stenkamp et al, "Grid polarizer for the visible spectral region," SPIE vol. 2213 pp. 288–296.

Handbook of Optics, 1978, pp. 10–68—10–77.

Hand of Optics vol. II, $2^{nd}$ Edition, pp. 3.32–3.35.

Glytsis and Gayloard, "High–spatial–frequency binary and multilevel stairstep gratings: polarization–selective mirrors and broadband antireflection surfaces," Applied Optics Aug. 1, 1992 vol. 31, No. 22 pp. 4459–4470.

Auton, "Infrared Transmission Polarizers by Photolithography, " Applied Optics Jun. 1967 vol. 6, No. 6, pp. 1023–1027.

Haggans et al., "Lamellar gratings as polarization components for specularly reflected beams," Journal of Modern Optics, 1993, vol. 40, No. 4, pp. 675–686.

Nordin et al., "Micropolarizer array for infrared imaging polarimetry", J. Op. Soc. Am. A. vol. 16 No. 5/May 1999.

Lavin, "Specular Reflection", Monographs on App. Opt. No. 2.

Maystre & Dainty, Modern Analysis of Scattering Phenomena Proceeding from International Workshop held at Domaine deTournon, Aix en Provence, France Sep. 5–8, 1990.

Bird and Parrish, Jr., "The Wire Grid as a Near–Infrared Polarizer," J. Op. Soc. Am. vol. 50 No. 9 (1960).

Optics $9^{th}$ Edition, pp. 338–339 (1980).

Whitebourn and Douglas, "Phase shifts in transmission line models of thin periodic metal grids," Applied Optics Aug. 15, 1989 vol. 28, No. 15, pp. 3511–3515.

Enger and Case, "Optical elements with ultrahigh spatial––frequency surface corrugations," Applied Optics Oct. 15, 1983, vol. 22, No. 20 pp. 3220–3228.

Knop, "Reflection Grating Polarizer for the Infrared," Optics Communication vol. 26, No. 3, Sep. 1978.

Hass and O'Hara, "Sheet Infrared Transmission Polarizers," Applied Optics Aug. 1965, vol. 4, No. 8, pp. 1027–1031.

Flanders, "Submicron periodicity gratins as artificial anisotropic dielectrics," Appl. Phys. Lett. 42 (6), Mar. 15, 1983, pp. 492–494.

Li Li and J.A. Dobrowski, "Visible broadband, wide–angle, thin–film multilayer polarizing beam splitter," Applied Optics May 1, 1996, vol. 35, No. 13, pp. 2221–2224.

Sonek et al., "Ultraviolet grating polarizers," J. Vac. Sci. Technol., 19(4), Nov./Dec. 1981, pp. 921–923.

N.M. Ceglio, Invited Review "Revolution in X–Ray Optics", J. X–Ray Science & Tech. 1, 7–78 (1989).

Dainty, et al., "Measurements of light scattering by characterized random rough surface", Waves in Random Media 3 (1991)/

DeSanto & Wombell, "Rough surgace scattering", Waves in Random Media 1 (1991).

Moshier, Davis & Ahearn, "The Corrosion and Passivity of Aluminum Exposed to Dilute Sodium Sulfate Solutions", Corrosion Science vol. 27, No. 8, pp 785–801, 1987.

Zanzucchi & Thomas III, "Corrosion Inhibitors for Aluminum Films", Journal of the Electrochemical Society, vol. 135, No. 6, Jun. 1988.

Scandurra, Curro, Frisina, & Pignataro; "Corrosion Inhibition of Al Metal in Microelectronic Devices Assembled in Plastic Packages", Journal of The Electrochemical Society, 148 (8) B289–B292 (2001).

* cited by examiner

CORROSION RESISTANT WIRE-GRID POLARIZER AND METHOD OF FABRICATION

BACKGROUND OF THE INVENTION

1. Field of the Invention

The present invention relates generally to wire-grid polarizers for physically decoupling two orthogonal porlarizations of visible or near-visible light. More particularly, the present invention relates to a corrosion resistant wire-grid polarizer, and a method for treating such a wire-grid polarizer to resist reactivity.

2. Related Art

Wire-grid polarizers have been developed that are operable in the visible and near-visible spectrum of electromagnetic radiation or light to generally decouple the two orthogonal polarizations of the light. Such wire-grid polarizers can be useful in optical systems such as image projections systems and image display systems.

Concerns exist, however, about the durability or long-term integrity of the wire-grid polarizers. Specifically, it is a concern that the conductive elements may be susceptible to corrosion or deterioration, especially in situations or applications where humidity or moisture and heat are present. It will be appreciated that the extremely small size of the grids may make the grids more susceptible to corrosion, or may exacerbate the results of such corrosion. The corrosion of the grids can reduce or destroy the ability of the grids to decouple the orthogonal polarizations of the light, thus defeating the purpose of the polarizer. In addition, the corrosion of the grids can detrimentally affect or alter the properties of the light, thus frustrating the operation or performance of the optical system.

Simply encapsulating the grids in order to protect the grids raises additional concerns. In addition to decoupling the orthogonal polarizations of light, it also is desirable that the wire-grid polarizer otherwise unalter the light. The material used to encapsulate the grids can create an interface between the material and the elements or the substrate that can alter various properties of the polarizer. Thus, encapsulating the grids might protect the elements, but also might undesirably alter other properties of the polarizer, thus affecting properties of the light, again frustrating the operation or performance of the optical system.

SUMMARY OF THE INVENTION

It has been recognized that it would be advantageous to develop a polarizing device, such as a wire-grid polarizer, that decouples orthogonal polarization of visible and near-visible light, resists corrosion or reactivity, and that otherwise does not undesirably alter the light. In addition, it has been recognized that it would be advantageous to develop a method for fabricating such a wire-grid polarizer, or for treating such a wire-grid polarizer, to resist corrosion or reactivity, without otherwise undesirably altering the light, and which is inexpensive.

The invention provides a corrosion resistant polarizer device, such as a wire grid polarizer, for generally decoupling two orthogonal polarizations of electromagnetic waves within wavelengths within the range of ultraviolet, visible and infra-red, such as visible visible light. The polarizer device can include an optical element with a nano-structure. The optical element can include a transparent substrate having an optical property of transmitting the electromagnetic waves or visible light therethrough. The nano-structure can include an array of spaced-apart, elongated elements disposed on the substrate. The elements can be sized to interact with electromagnetic waves of the electromagnetic waves or visible light to generally transmit electromagnetic waves of one polarization, and generally reflect electromagnetic waves of another polarization. A substantial monolayer advantageously can be chemically bonded to, or reacted with, the elongated elements, or a native oxide layer on the elements, without substantially adversely effecting the optical property of the transparent substrate to transmit the electromagnetic waves or visible light, and without substantially adversely altering the electromagnetic waves or visible light transmitted through the array of spaced-apart, elongated elements and the transparent substrate. The monolayer can be formed from a corrosion inhibitor, and can have a thickness less than approximately 100 Angstroms.

In accordance with a more detailed aspect of the present invention, the corrosion inhibitor can include, or the monolayer can be formed from, an amino phosphonate applied to the elongated elements. The amino phosphonate can include a nitrilotris (methylene) triphosphonic acid, or NTMP. The amino phosphonate and the polarizer device advantageously can be heated together to a temperature greater than approximately 150 degrees Celsius.

A method for resisting corrosion of elements of the polarizer device, or to fabricate the polarizer device, includes the step of chemically bonding a corrosion inhibitor to the elongated elements to form a layer having a thickness less than approximately 100 Angstroms. The layer can be formed on, and chemically bonded to, the elements by applying an amino phosphonate to at least the elongated elements, such as by dipping or soaking the polarizer device in the corrosion inhibitor. The polarizing device can be dipped and soaked in a solution of nitrilotris (methylene) triphosphonic acid (or NTMP). In addition, the polarizer device can be heated at a temperature greater than approximately 150 degrees Celsius.

Additional features and advantages of the invention will be apparent from the detailed description which follows, taken in conjunction with the accompanying drawings, which together illustrate, by way of example, features of the invention.

DETAILED DESCRIPTION

Figure 1:
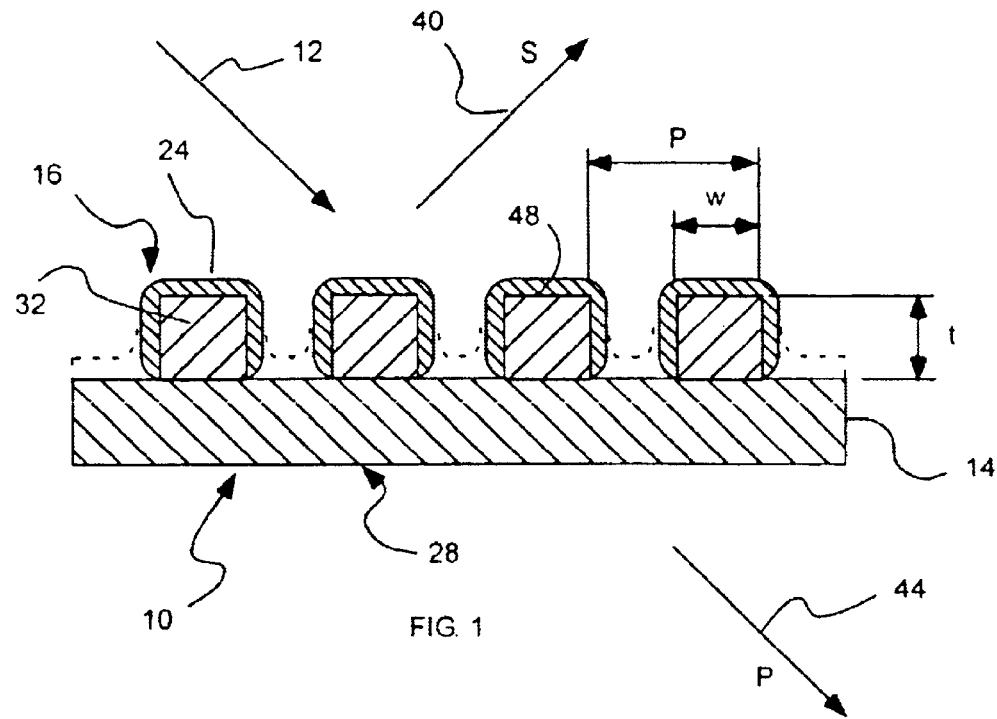
FIG. 1 is a cross-sectional end view of a wire-grid polarizer in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
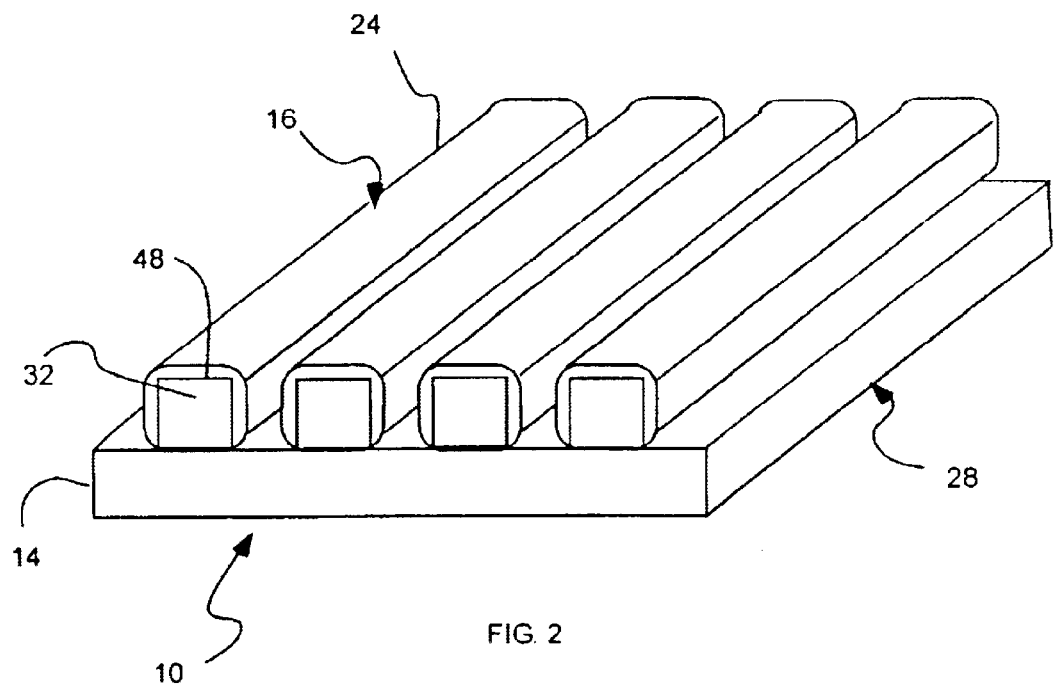
FIG. 2 is a perspective view of a cross-sectional view of the wire-grid polarizer of FIG. 1.

As illustrated in FIGS. 1 and 2, a polarizing device, indicated generally at 10, such as a wire-grid polarizer, in accordance with the present invention is shown for generally decoupling two orthogonal polarizations of a beam of electromagnetic waves, indicated generally at 12. In one aspect the beam 12 of electromagnetic waves can include visible light. The polarizing device 10 or wire-grid polarizer can include an optical element 14 and a nano-structure 16. As discussed in greater detail below, the polarizing device 10 or the wire-grid polarizer advantageously includes a substantial mono-layer 24 formed from a corrosion inhibitor to resist corrosion, without adversely affecting the optical properties of the optical element 14, or the polarizing device 10. Such a polarizing device 10 or wire-grid polarizer may be used in various applications, such as image displays (monitors, flat panel displays, LCDs, etc.), image projectors, optical trains, scientific and medical instruments, etc.

The polarizing device 10 or the optical element 14 can include a substrate 28. The substrate 28 can be transparent to the electromagnetic waves or visible light so that the electromagnetic waves or light can be transmitted by, or pass through, the substrate. Thus, the optical element 14 or substrate 28 can have an optical property of transmitting the electromagnetic waves or visible light. In one aspect, the optical element 14 or substrate 28 can transmit the electromagnetic waves or light without otherwise altering it, such as, without changing the phase, angle, etc. The substrate 28 can include, or be formed by, a glass material. It will be appreciated that other materials, such as plastics, quartz, etc. can be used.

In addition, the polarizing device 10 or the nano-structure 16 can include an array of a plurality of spaced-apart, elongated elements 32. The elements 32 can be conductive, or formed of a conductive material, and can be disposed on or supported by a surface of the substrate 28. It will be appreciated that other structures, materials, or layers can be disposed between the elements 32 and the substrate 28, including for example, ribs, gaps, grooves, layers, films, etc. In addition, a region can be formed between the elements and the substrate with a low refractive index (or a refractive index lower than a refractive index of the substrate), and a controlled thickness. The low index region separating the elements from the substrate can shift the longest wavelength resonance point to a shorter wavelength, and can reduce the fraction of P polarized electromagnetic waves or light that is reflected from the polarizer.

The elements 32 are relatively long and thin. All or most of the elements 32 can have a length that is generally larger than the wavelength of desired electromagnetic waves or visible light. Thus, the elements 32 have a length of at least approximately 0.7 $\mu$m (micrometers or microns) for visible light applications. The typical length, however, may be much larger. The elements 32 can have a thickness or a height t less than the wavelength of the desired electromagnetic waves or light, or less than 0.4 $\mu$m (micrometers or microns) for visible light applications. In one aspect, the thickness can be less than 0.2 $\mu$m for visible light applications. In addition, the elements 32 are located in generally parallel arrangement with a spacing, pitch, or period P of the elements being smaller than the wavelength of the desired electromagnetic waves or light. Thus, the elements 32 have a pitch P of less than 0.4 $\mu$m (micrometers or microns) for visible light applications. In one aspect, the pitch P can be approximately one-half the wavelength of light, or approximately 0.2 $\mu$m for visible light applications. The elements 32 also can have a width w less than the period P, or less than 0.4 $\mu$m or 0.2 $\mu$m for visible light applications. In one aspect, the width can be less than 0.1–0.2 $\mu$m for visible light applications. It should be noted that arrays with longer periods (greater than approximately twice the wavelength of light or 1.4 $\mu$m) can operate as diffraction gratings, while arrays with shorter periods (less than approximately half the wavelength of light or 0.2 $\mu$m) operate as polarizers, while arrays with periods in a transition region (between approximately 0.2 and 1.4 $\mu$m) also act as diffraction gratings and are characterized by abrupt changes or anomalies referred to as resonances. Thus, it will be appreciated that the actual size of the elements 32 is quite small, and the array of elements 32 can actually appear as a continuous, reflective surface to the unaided eye. As shown in the figures, however, the array of elements 32 actually creates a very small structure, or nano-structure 16 with a size or scale on the order of $10^{-8}$ meters.

In addition, the size and configuration of the array of elements 32 is designed to interact with the electromagnetic waves or visible light to generally transmit electromagnetic waves of one polarization, and generally reflect electromagnetic waves of another polarization. As stated above, a beam 12 can be incident on the polarizer device 10. The polarizer device 10 can divide the beam 12 into a specularly reflected component 40, and a non-diffracted, transmitted component 44. Using the normal definitions for S and P polarization, the wave or light with S polarization has the polarization vector orthogonal to the plane of incidence, and thus parallel to the conductive elements. Conversely, wave or light with P polarization has the polarization vector parallel to the plane of incidence and thus orthogonal to the conductive elements.

In general, the polarizer device 10 can reflect waves or light with its electric field vector parallel to the elements 32 (or the S polarization), and transmit waves or light with its electric field vector perpendicular to the elements (or the P polarization). Ideally, the polarizer device can function as a perfect mirror for one polarization of waves or light, such as the S polarized light, and can be perfectly transparent for the other polarization, such as the P polarized light. In practice, however, even the most reflective metals used as mirrors absorb some fraction of the incident light and reflect only 90% to 95%, and plain glass does not transmit 100% of the incident light due to surface reflections.

As stated above, an important consideration in optics and/or image processing is the controlled and deliberate manipulation of light, without adversely or unintentionally affecting the light or properties thereof. For example, while it can be desirable to polarize (or separate the polarization of) the light with a polarizing device, it is undesirable for the polarizing device to unintentionally alter the light, such as by inadvertently introducing phase shifts, or changing the angle. It is known in the field of optics that the addition of materials to optical elements can create an interface between the optical element and added material that can change the optical properties of the optical element, and thus the light. Therefore, the addition of materials to optical elements is only done with great care.

In the particular case of wire-grid polarizers, it has been found that the addition of thin layers of materials on the wire-grid structure has a deleterious effect on the performance of the device. Such layers will affect both the polarization contrast, or the ability of the polarizer to completely separate the two polarizations, and the efficiency of transmission of the one polarization. These effects can be so significant as to render the polarizer unsuitable for use. These deleterious effects occur because the wire-grid polarizer is a nano-structured device in which the function is dependent on the wavelength of the light. The addition of thin layers of material can change the effective wavelength of the light in relation to the fixed dimensions of the wire-grid, which change would cause a reduction in performance. This effect has been shown by experiment to be measurable even for layers that are only 200–300 Angstroms thick.

It has been discovered that a substantial mono-layer 24, as described below, can be formed over at least the nano-structure 16 or the elements 32, as shown in solid lines, to resist corrosion of the elements 32, and without substantially altering or detrimentally affecting the optical properties of the optical element. (It will be noted that the layer shown in the figures is greatly exaggerated for clarity.) The mono-layer 24 may also be formed over portions of the optical element 14 or the substrate 28, as shown in dashed lines. As used herein, the term "substantial mono-layer" is used to refer to a layer having a thickness of less than approximately 100 Angstroms. This mono-layer consists of one or more molecular or atomic layers. It is believed that the extreme thinness of the layer 24 contributes to the layer's lack of interference with the optical properties of the optical element 14 or substrate 28, or lack of interference with the beam 12 of light or the reflected or transmitted beams 40 or 44.

In addition, the layer 24 advantageously is chemically bonded to, or reacts with, the elements 32, or to a natural oxide layer 48 on the elements, so that the layer covers exposed surfaces of the elements (the exposed surfaces being those not contacting the substrate). It is believed that the chemical bond of the layer 24 to the elements 32 permits the layer to be extremely thin, and contributes to the layer's ability to resist corrosion. Again, the chemical bond formed only with the elements 32 is believed to be another reason why the layer 24 does not affect the optical properties of the polarizer device 10.

The layer 24 can be formed from a material including a corrosion inhibitor, as described in greater detail below. Such a corrosion inhibitor can include an amino phosphonate. In particular, the corrosion inhibitor can include a nitrilotris (methylene) triphosphonic acid (or NTMP). Such an NTMP material is presently available from Aldrich Chemical Company as #14,479-7. It has been found that such a corrosion inhibitor chemically reacts with the elements 32 to form a chemical bond between the material and the elements, and to create the layer 24. In addition, it has been unexpectedly found that the application of these corrosion inhibitors to the polarizer device 10 does not substantially interfere with the optical properties of the polarizer device 10, optical element 14, or substrate 28.

As stated above, the elements can be formed from a conductive material. For example, the elements can include aluminum or silver. Many materials can have a natural or native oxide layer that can provide a limited, but inadequate corrosion resistance. Thus, the surface of the elements can have a native or natural oxide layer that provides a limited, but inadequate corrosion resistance. It has been found that the amino phosphonate, or the nitrilotris (methylene) triphosphonic acid, can be used to form the substantial mono-layer, even on the nano-structure. It is believed that the amino phosphonate, or the NTMP, alters the natural oxide layer by reacting with the material surface, adding the substantial mono-layer over the natural oxide layer. It is also believed that the amino phosphonate, or the NTMP, chemically bonds to the native oxide layer.

A method for fabricating the polarizing device 10 described above, and for resisting corrosion of the elements of the wire-grid polarizer, includes chemically bonding the corrosion inhibitor to the elements to form a substantial mono-layer with a thickness less than approximately 100 Angstroms. The substantial mono-layer and/or the chemical bond can be formed by applying the corrosion inhibitor to the elements, and to the polarizing device 10, in a liquid solution. For example, the polarizing device 10 can be dipped into a solution of the amino phosphonate, or the NTMP. In particular, it has been found that a solution of 0.0002 liters NTMP per liter of distilled water is desirable. For example, NTMP can be added to distilled water in a quantity of 4 drops per liter. In addition, the polarizing device 10 can be soaked in the solution for a period of time. After dipping and soaking the polarizing device 10 in the solution of corrosion inhibitor (amino phosphonate or NTMP), the polarizing device 10 can be rinsed with distilled water. It has been found that dipping and soaking the elements of the polarizing device can form a layer on the elements that is chemically bonded to the elements. It has also been found that the layer is formed completely on all the exposed surfaces (those surfaces not contacting the substrate) to completely surround and bond to the elements.

In addition, the layer on the elements, and the polarizing device, advantageously can be heated or baked. It has unexpectedly and advantageously been found that heating the polarizing device improves the corrosion resistance of the layer. In particular, it has been found that heating the polarizing device to greater than 150 degrees Celsius improves the corrosion resistance of the layer.

As an example, a polarizer device was dipped into a solution of NTMP with a concentration of 10 ml per 25 liter tank (or a concentration of 0.0002 NTMP per liter of distilled water). The temperature of the solution was 80 degrees Celsius. The polarizer device was soaked for 20 minutes, and rinsed for 1 minute. The polarizer device was heated or baked at 200 degrees Celsius for 20 minutes. The polarizer device was then subjected to boiling distilled water (to simulate environmental conditions, and to accelerate corrosion) until failure occurred. The polarizer device thus treated exhibited the greatest corrosion resistance.

Various other polarizer devices were fabricated under various different processing methods. It was found that the heat or bake temperature appears to be the most critical factor, with 200 degrees Celsius being better than 150 degrees Celsius, and with 150 degrees Celsius being better than 100 degrees Celsius. The next most important factor appeared to be dip or soak temperature, with 80 degrees Celsius being better than 70 degrees Celsius, but with 90 degrees Celsius being worse than 80 degrees Celsius. The next most important factor appeared to be dip or soak time, with 20 minutes being better than 15 minutes or 40 minutes.

As discussed above, it is desirable to fabricate a wire-grid polarizer, or to treat a wire-grid polarizer, to resist corrosion or reactivity of the elements, which is optically negligible, and which is inexpensive.

Also as discussed above, a wire-grid polarizer presents unique challenges for corrosion protection due to its configuration as both an optical element and a nano-structure. While traditional corrosion inhibitors may have been applied to traditional materials, there is no expectation that corrosion inhibitors can be successfully utilized with optical elements. In fact, the presumption in optics is often that the addition of such foreign materials to optical elements will adversely affect the optical element, and thus the light. Therefore, such foreign materials are often strictly avoided. For example, the addition of as little as 100 nm of a material which has absorptive properties can seriously affect the transmission properties of an optical component. Since it is well known that materials can age or change properties with exposure to light over extended periods of time, even very thin layers of new or unknown materials are avoided. Thus, the field of optics traditionally limits the substances applied to optics to those traditionally used. For example, it is known to seal the surface of an aluminum mirror with a coating of silicon dioxide. Such a coating is relatively thick, but provides known results. Such a coating, however, detrimentally affects the operation and performance of a wire-grid polarizer.

In addition, there is no expectation that corrosion inhibitors can be successfully utilized with nano-structures. It is desirable to absolutely protect the elements, rather than to just slow corrosion. It will be appreciated that while corrosion to a depth of of 200 nm can be negligible or insignificant in traditional corrosion situations, such corrosion can completely destroy the nano-structure of the wire-grid polarizer, causing catastrophic failure. In fact, corrosion of just 10 nm depth in the wire grid polarizer will have measurable effects on the contrast ratio.

Traditional methods of corrosion protection apply a fairly thick (200 nm–1000 nm) film or protective coating in order to provide the required degree of reliable protection against corrosion. Experiments with thin films (on the order of 100 nm) of polymers and other materials with the goal of protecting the wire-grid have been unsuccessful. In fact, it has been found by experiment that the addition of optical overcoatings of traditional materials such as Magnesium Fluoride to thicknesses of 100 nm do not provide sufficient protection against corrosion of the wire-grid. Coatings of this thickness also cause measurable changes in the optical performance of the polarizer. All these experimental facts lead to the conclusion that protection of the wire-grid polarizer through the use of conventional techniques is not possible.

In addition, the nano-structure of the wire-grid polarizer presents a structure that is different from traditional surfaces by providing numerous, individual elements spaced-apart from one another, as opposed to a continuous surface. Thus, the nano-structure presents both structured surfaces, as opposed to continuous surfaces, and extremely small structures, and it is not tolerant of even a small amount of corrosion.

The fabrication or treatment of the wire-grid polarizer with a corrosion inhibitor, such as NTMP, to form a substantial mono-layer with a thickness less than approximately 100 Angstroms, and that is chemically bonded to, or reacts with, the surface of the elements, produced surprising and unexpected results. The treated wire-grid polarizers exhibited both exceptional optical performance, and exceptional corrosion resistance.

In addition to the above-described amino phosphonate or NTMP corrosion inhibitors, other phosphate based hydration inhibitors may be used, including for example, methyl phosphonic acid (MPA). Silanes can be used, such as 2-(3,4-epoxycyclohexyl)-ethyltrimethoxysilane, or phenyltriethosysilane. Siloxanes can be used, such as Oxyalkylsiloxane. Azole based materials can be used, such as benzotriazole, benzotriazole amine, tolyltriazole, sodium tolyltriazole, or carboxybenzotriazole. Heavy metal materials can be used, such as cromium, molybdneum, or tungsten. For example, the surface can be dipped into a solution of metal-containing compounds, such as Na2MoO4, thus creating a protective monolayer. Organic materials can be used, such as Rodine™ or Alodine™, available from the Henkel Corporation, Madison Heights, Mich. 48071. In addition, n-alkanoate materials can be used.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A corrosion resistant wire grid polarizer device, comprising:

a) a transparent substrate having an optical property of transmitting electromagnetic waves having a wavelength within the range of ultraviolet, visible and infra-red;

b) an array of spaced-apart, elongated elements, disposed on the substrate, sized to interact with electromagnetic waves having a wavelength within the range of ultraviolet, visible and infra-red to generally transmit electromagnetic waves of one polarization, and generally reflect electromagnetic waves of another polarization; and c) a substantial mono-layer, chemically bonded to the elongated elements without substantially adversely affecting the optical property of the transparent substrate to transmit the electromagnetic waves, and without substantially adversely altering the electromagnetic waves transmitted through the array of spaced-apart, elongated elements and the transparent substrate, the mono-layer being formed from a corrosion inhibitor and having a thickness less than approximately 100 Angstroms.

d) the substantial mono-layer including an amino phosphonate applied to the elongated elements.

2. A device in accordance with claim 1, wherein the elements have a thickness less than approximately 400 nm, a width less than approximately 300 nm, a length greater than approximately 700 nm, and a pitch of less than approximately 400 nm.

3. A device in accordance with claim 1, wherein the amino phosphonate includes a nitrilotris (methylene) triphosphonic acid.

4. A device in accordance with claim 1, wherein the amino phosphonate and the wire grid polarizer device have been heated together to a temperature greater than approximately 150 degrees Celsius.

5. A corrosion resistant wire grid polarizer device for generally decoupling two orthogonal polarizations of electromagnetic waves, the device comprising:

a) an optical element formed from a transparent material to transmit electromagnetic waves having a wavelength within the range of ultraviolet, visible and infra-red;

b) a nano-structure, associated with the optical element, including an array of spaced-apart, elongated elements with a thickness on the order of $10^{-8}$ m, to interact with the electromagnetic waves having a wavelength within the range of ultraviolet, visible and infra-red to generally transmit electromagnetic waves of one polarization, and generally reflect electromagnetic waves of another polarization; and c) a corrosion resistant layer, chemically bonded to the nano-structure, having a thickness less than approximately 100 Angstroms, the layer resisting corrosion of the nano-structure without substantially adversely effecting an optical property of the optical element to transmit the electromagnetic waves, and without substantially adversely altering the electromagnetic waves transmitted through the nano-structure and the optical element; and d) the corrosion resistant layer including an amino phosphonate applied to the elongated elements.

6. A device in accordance with claim 5, wherein the elements have a thickness less than approximately 400 nm, a width less than approximately 300 nm, a length greater than approximately 700 nm, and a pitch of less than approximately 400 nm.

7. A device in accordance with claim 5, wherein the amino phosphonate includes a nitrilotris (methylene) triphosphonic acid.

8. A device in accordance with claim 5, wherein the amino phosphonate and the wire grid polarizer device have been heated together to a temperature greater than approximately 150 degrees Celsius.

9. A method for resisting corrosion of elements of a wire grid polarizer, comprising the steps of:

a) providing a wire grid polarizer having an array of spaced-apart, elongated elements, disposed on a substrate, sized to interact with electromagnetic waves having a wavelength with the range of ultraviolet, visible and infra-red to generally transmit electromagnetic waves of one polarization, and generally reflect electromagnetic waves of another polarization;

b) chemically bonding a corrosion inhibitor to the elongated elements including applying an amino phosphate to at least the elongated elements to form a layer having a thickness less than approximately 100 Angstroms.

10. A method in accordance with claim 9, wherein the step of chemically bonding a corrosion inhibitor to the elongated elements further includes chemically bonding the corrosion inhibitor to all exposed surfaces of the elongated elements.

11. A method in accordance with claim 9, wherein the step of applying the amino phosphonate further includes applying nitrilotris (methylene) triphosphonic acid to at least the elements.

12. A method in accordance with claim 9, further comprising the step of:

heating the wire grid polarizer at a temperature greater than approximately 150 degrees Celsius.

13. A method in accordance with claim 9, wherein the step of applying the amino phosphonate further includes applying a liquid with a solution of 0.0002 liters nitrilotris (methylene) triphosphonic acid per liter of distilled water.

14. A method in accordance with claim 9, wherein the step of applying the amino phosphonate corrosion inhibitor includes dipping the wire grid polarizer in the amino phosphonate corrosion inhibitor at a temperature greater than approximately 70 degree Celsius.

15. A method in accordance with claim 14, further comprising the step of:

rinsing the wire grid polarizer after the amino phosphonate corrosion inhibitor is applied and before drying.

16. A method in accordance with claim 9, wherein the step of chemically bonding a corrosion inhibitor to the elongated elements further including the step of:

altering a natural oxide layer formed on the elongated elements.

17. A corrosion resistant wire grid polarizer device, comprising:

a) a transparent substrate having an optical property of transmitting electromagnetic waves having a wavelength within the range of ultraviolet, visible and infra-red;

b) an array of spaced-apart, elongated elements, disposed on the substrate, sized to interact with electromagnetic waves having a wavelength within the range of ultraviolet, visible and infra-red to generally transmit electromagnetic waves of one polarization, and generally reflect electromagnetic waves of another polarization; and c) a substantial mono-layer including an amino phosphonate, disposed over the elongated elements without substantially adversely affecting the optical property of the transparent substrate to transmit the electromagnetic waves, and without substantially adversely altering the electromagnetic waves transmitted through the array of spaced-apart, elongated elements and the transparent substrate.

18. A device in accordance with claim 17, wherein the mono-layer has a thickness less than approximately 100 Angstroms.

19. A device in accordance with claim 17, wherein the amino phosphonate includes a nitrilotris (methylene) triphosphonic acid.

20. A device in accordance with claim 17, wherein the amino phosphonate and the wire grid polarizer device have been heated together to a temperature greater than approximately 150 degrees Celsius.

21. A corrosion resistant wire grid polarizer device, comprising:

a) a transparent substrate having an optical property of transmitting electromagnetic waves having a wavelength within the range of ultraviolet, visible and infra-red;

b) an array of spaced-apart, elongated elements, disposed on the substrate, sized to interact with electromagnetic waves having a wavelength within the range of ultraviolet, visible and infra-red to generally transmit electromagnetic waves of one polarization, and generally reflect electromagnetic waves of another polarization;

c) a natural oxide layer, disposed on the elongated elements; and d) a substantial mono-layer formed from an amino phosphonate, disposed over the natural oxide layer and the elongated elements without substantially adversely affecting the optical property of the transparent substrate to transmit the electromagnetic waves, and without substantially adversely altering the electromagnetic waves transmitted through the array of spaced-apart, elongated elements and the transparent substrate.

22. A device in accordance with claim 21, wherein the mono-layer has a thickness less than approximately 100 Angstroms.

23. A device in accordance with claim 21, wherein the amino phosphonate includes a nitrilotris (methylene) triphosphonic acid.

24. A device in accordance with claim 21, wherein the amino phosphonate and the wire grid polarizer device have been heated together to a temperature greater than approximately 150 degrees Celsius.

* * * * *